United States Patent
Takeuchi

(10) Patent No.: US 9,575,777 B2
(45) Date of Patent: Feb. 21, 2017

(54) INFORMATION PROCESSING DEVICE FOR PERFORMING CONTACTLESS COMMUNICATION WITH AN EXTERNAL DEVICE USING MULTIPLE COMMUNICATION STANDARDS

(75) Inventor: Yasuo Takeuchi, Tokyo (JP)

(73) Assignee: Sony Corporation, Tokyo (JP)

(*) Notice: Subject to any disclaimer, the term of this patent is extended or adjusted under 35 U.S.C. 154(b) by 660 days.

(21) Appl. No.: 13/363,076

(22) Filed: Jan. 31, 2012

(65) Prior Publication Data

US 2012/0233618 A1 Sep. 13, 2012

Related U.S. Application Data

(60) Provisional application No. 61/450,458, filed on Mar. 8, 2011.

(51) Int. Cl.
| | |
|---|---|
| *G06F 9/46* | (2006.01) |
| *G06F 9/445* | (2006.01) |
| *H04M 1/725* | (2006.01) |
| *H04W 4/00* | (2009.01) |

(52) U.S. Cl.
CPC ........ *G06F 9/44505* (2013.01); *H04M 1/7253* (2013.01); *H04W 4/008* (2013.01); *H04M 2250/04* (2013.01)

(58) Field of Classification Search
CPC ................................................. G06F 9/44505
See application file for complete search history.

(56) References Cited

U.S. PATENT DOCUMENTS

| | | | | |
|---|---|---|---|---|
| 2004/0003166 A1* | 1/2004 | Sekiya | ............... | G06K 17/0022 711/103 |
| 2004/0122774 A1* | 6/2004 | Studd | ..................... | G06Q 20/32 705/65 |
| 2004/0200903 A1 | 10/2004 | Ohya et al. | | |
| 2005/0167512 A1* | 8/2005 | Minemura et al. | ........... | 235/492 |

(Continued)

FOREIGN PATENT DOCUMENTS

| | | |
|---|---|---|
| CN | 1538349 A | 10/2004 |
| JP | 2002-279371 A | 9/2002 |

(Continued)

OTHER PUBLICATIONS

Extended European Search Report issued Sep. 3, 2012 in Patent Application No. 12156477.7.

(Continued)

*Primary Examiner* — Benjamin Wu
*Assistant Examiner* — James J Lee
(74) *Attorney, Agent, or Firm* — Oblon, McClelland, Maier & Neustadt, L.L.P.

(57) ABSTRACT

There is provided an information processing device including a selection unit configured to, on the basis of first identification information included in a processing instruction and corresponding to a service, and first association information in which the first identification information is associated with second identification information for identifying an application, select an application to perform the service corresponding to the processing instruction, and an execution unit configured to cause the selected application to perform a process in accordance with the processing instruction.

12 Claims, 7 Drawing Sheets

(56) References Cited

U.S. PATENT DOCUMENTS

| | | | | |
|---|---|---|---|---|
| 2005/0235278 A1* | 10/2005 | Wu | ............... | G06F 9/441 717/168 |
| 2007/0294707 A1* | 12/2007 | Taillefer | ............... | G06F 9/5077 719/319 |
| 2008/0207128 A1 | 8/2008 | Mikko | | |
| 2009/0094587 A1* | 4/2009 | Kawai | ............... | G06F 9/45516 717/141 |
| 2009/0201304 A1* | 8/2009 | Suzuki | ............... | G06K 19/0723 345/530 |
| 2009/0247077 A1 | 10/2009 | Sklovsky et al. | | |
| 2009/0247078 A1* | 10/2009 | Sklovsky | ............... | H04L 67/16 455/41.1 |
| 2010/0043016 A1* | 2/2010 | Anzai | ............... | 719/320 |
| 2011/0138390 A1 | 6/2011 | Takeuchi | | |
| 2011/0197203 A1 | 8/2011 | Takeuchi | | |
| 2011/0267985 A1* | 11/2011 | Wilkinson | ............... | H04M 1/2535 370/259 |

FOREIGN PATENT DOCUMENTS

| | | |
|---|---|---|
| JP | 2003-76958 A | 3/2003 |
| JP | 2004-139244 A | 5/2004 |
| JP | 2004-151864 A | 5/2004 |
| JP | 2005-84916 A | 3/2005 |
| JP | 2005-242445 | 9/2005 |
| JP | 2007-286905 A | 11/2007 |
| JP | 2009-271836 A | 11/2009 |
| JP | 2010-39913 A | 2/2010 |
| JP | 2011-118337 | 6/2011 |
| JP | 2012-10206 | 1/2012 |
| JP | 2012-10207 | 1/2012 |

OTHER PUBLICATIONS

Office Action issued Nov. 4, 2015 in Japanese Patent Application No. 2012-044381.

Chinese Office Action issued Apr. 1, 2016, in Chinese Patent Application No. 201210051094.6 (English translation provided).

European Office Action issued Apr. 22, 2016, in European Patent Application No. 12156477.7.

* cited by examiner

FIG. 3
| A | B |
|---|---|
| SC | IDm |
| 1234 | IDm1 |
| 2345 | IDm2 |
| 3456 | IDm3 |
| 456F | IDm4 |
FIG. 4
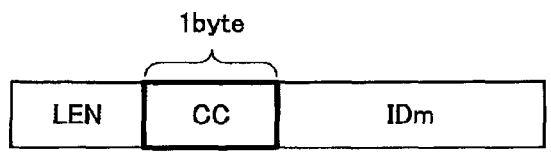
FIG. 5
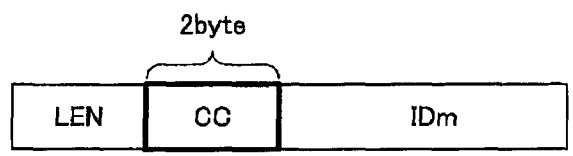
FIG. 6
| A | B |
|---|---|
| IDm | AID |
| IDm1 | xx1 |
| IDm2 | yy2 |
| IDm3 | zz3 |
| IDm4 | zz3 | ure # INFORMATION PROCESSING DEVICE FOR PERFORMING CONTACTLESS COMMUNICATION WITH AN EXTERNAL DEVICE USING MULTIPLE COMMUNICATION STANDARDS

BACKGROUND

The present disclosure relates to an information processing device, an information processing method, and a program.

In recent years, an information processing device capable of performing contactless communication with a reader/writer (or an information processing device having reader/writer functions, hereinafter the same), such as a contactless IC (Integrated Circuit) card or a portable phone having a contactless IC chip mounted thereon, for example, has come into widespread use. The reader/writer and the information processing device such as an IC card or a portable phone use a magnetic field (carrier wave) with a predetermined frequency such as 13.56 MHz, for example, for communication. Specifically, the reader/writer and the information processing device such as an IC card communicate with each other in such a way that the reader/writer transmits a carrier wave having a carrier signal superimposed thereon, and the information processing device, which has received the carrier wave using an antenna, returns a response signal in response to the received carrier signal through load modulation.

Herein, examples of NFC (Near Field Communication) in which communication is performed using a carrier wave with a predetermined frequency such as 13.56 MHz as described above include various communication methods such as "ISO/IEC 18092 Type F," "ISO/IEC 14443 Type A," and "ISO/IEC 14443 Type B." In addition, examples of the information processing device include a device that supports a plurality of communication methods or communication standards by having an operating system (hereinafter also referred to as an "OS") supporting each communication method, like a dual card, for example.

Against such a background, there has been developed a technology for performing a process, which supports each of a plurality of communication methods or standards, normally. For example, as a technology that can perform a process supporting the structure of a received message even when the structure of a message when contact communication is performed with an external device and the structure of a message when contactless communication is performed with an external device differ, there is known a technology disclosed in JP 2005-242445A, for example. In addition, as a technology for causing an application, which simulates an OS run on an execution environment different from usual, to execute an instruction from an external device without changing the specifications of the instruction from the external device, there is known a technology disclosed in JP 2011-118837A, for example.

SUMMARY

As a method of making an information processing device support a plurality of communication methods or communication standards, there is known a method in which, like a dual card, for example, an information processing device has a plurality of OSs such as a "FeliCa® OS" and a "Java Card™ OS" (for example, a configuration corresponding to FIG. 1A described below). However, when such a method is used, a plurality of OSs should be mounted on the information processing device.

Meanwhile, as another method of making an information processing device support a plurality of communication methods or communication standards, for example, a method is considered in which the information processing device has a single OS, and the function of another OS, which supports a communication standard other than the communication standard supported by the former OS, is mounted as an application (e.g., a configuration corresponding to FIG. 1B described below). Herein, in order to implement a communication system in which an information processing device that uses the aforementioned method performs contactless communication with a reader/writer (an example of an external device, hereinafter the same), it would be desirable that the reader/writer of the communication system have the same function and configuration as the reader/writer of the existing communication system. This is because, readers/writers that allow NFC communication are widely spread in the society, and it is thus not easy to replace such widely spread readers/writers with new ones.

Herein, in the technology disclosed in JP 2005-242445A, for example, a processing instruction contained in a received message is determined first, and then the received processing instruction is, on the basis of the determination result, relayed to a processing unit capable of processing the processing instruction, so that the received processing instruction is executed. However, when the technology disclosed in JP 2005-242445A is used, a device that transmits a message such as a reader/writer, for example, should transmit a special message (e.g., an APDU (Application-layer Protocol Data Unit) command). Accordingly, when the technology disclosed in 2005-242445A is used, for example, a reader/writer (a device that transmits a message) of the existing communication system should be replaced with a new one.

Meanwhile, in the technology disclosed in JP 2011-118837A, for example, an information processing device causes, on the basis of whether or not an initially received processing instruction (when starting communication) is a polling command (an example of a processing instruction), an application, which is executed on an OS and which implements the function of another OS, to perform a process corresponding to the received processing instruction. Accordingly, when the technology disclosed in JP 2011-118837A, for example, is used, it may become possible to implement a communication system in which an information processing device that uses the aforementioned method performs contactless communication with a reader/writer, without replacing the reader/writer of the existing communication system with a new one.

However, a processing instruction initially received (when starting communication) by the information processing device is not limited to a polling command. For example, when the communication between the reader/writer and the information processing device is interrupted for some reason, there is a possibility that the reader/writer may resume the communication from the stage interrupted last time without re-transmitting a polling command. When the reader/writer resumes the communication from the stage interrupted last time as described above, a processing instruction received first (when starting communication) by the information processing device will not be a polling command. Accordingly, even when the technology disclosed in JP 2011-118837A is used, it is not always the case that an information processing device to which the technology disclosed in JP 2011-118837A is applied, for example, is able to cause an application, which is executed on an OS and which implements the function of another OS, to process the received processing instruction.

The present disclosure proposes an information processing device, an information processing method, and a program that are novel and improved, and that can cause an application, which is capable of processing a processing instruction of a different communication method from a communication method supported by an operating system, to perform a process corresponding to a processing instruction received from an external device.

According to the present disclosure, there is provided an information processing device including a selection unit configured to, on the basis of first identification information included in a processing instruction and corresponding to a service, and first association information in which the first identification information is associated with second identification information for identifying an application, select an application to perform the service corresponding to the processing instruction, and an execution unit configured to cause the selected application to perform a process in accordance with the processing instruction.

According to the present disclosure, there is provided an information processing method including selecting, on the basis of first identification information included in a processing instruction and corresponding to a service, and first association information in which the first identification information is associated with second identification information for identifying an application, an application to perform the service corresponding to the processing instruction, and causing the selected application to perform a process in accordance with the processing instruction.

According to the present disclosure, there is provided program for causing a computer to execute selecting, on the basis of first identification information included in a processing instruction and corresponding to a service, and first association information in which the first identification information is associated with second identification information for identifying an application, an application to perform the service corresponding to the processing instruction, and causing the selected application to perform a process in accordance with the processing instruction.

According to the present disclosure, it is possible to cause an application, which is capable of processing a processing instruction of a different communication method from a communication method supported by an operating system, to perform a process corresponding to a processing instruction received from an external device.

According to the present disclosure, there is provided an information processing device including:

a selection unit configured to, on the basis of first identification information included in a processing instruction and corresponding to a service, and first association information in which the first identification information is associated with second identification information for identifying an application, select an application to perform the service corresponding to the processing instruction; and an execution unit configured to cause the selected application to perform a process in accordance with the processing instruction.

The information processing device, further including:

a communication unit configured to perform contactless communication with an external device; and a determination unit configured to determine the received processing instruction, wherein the determination unit:

determines if the received processing instruction includes service type information indicating a type of the service, and if the received processing instruction includes the service type information, causes the communication unit to return a reply including the first identification information corresponding to the service type information included in the processing instruction on the basis of the service type information included in the processing instruction and second association information in which the service type information is associated with the first identification information.

The information processing device, wherein when the selection unit has selected an application corresponding to the processing instruction, the selection unit maintains a state in which the selected application is selected, the execution unit, when the selected application is not an application corresponding to the processing instruction, transmits a selection request to the selection unit to re-select an application corresponding to the processing instruction, and the selection unit, when the selection request is transmitted, re-selects an application corresponding to the processing instruction on the basis of the first identification information included in the processing instruction and the first association information.

The information processing device, wherein the selection request includes second identification information indicating the selected application, and the selection unit selects, as an application to be selected, an application indicated by second identification information that satisfies a predetermined condition in relation to the second identification information included in the selection request, among second identification information included in the first association information The information processing device, wherein the selection request is the first identification information included in the processing instruction.

The information processing device, wherein the execution unit, when the selected application is not an application corresponding to the processing instruction:

determines if an application related to the selected application is able to perform a process in accordance with the processing instruction, and causes the application determined to be able to perform a process in accordance with the processing instruction to perform the process in accordance with the processing instruction.

The information processing device, wherein the information processing device is a portable communication device.

The information processing device, wherein the information processing device is an IC card.

An information processing method including:

selecting, on the basis of first identification information included in a processing instruction and corresponding to a service, and first association information in which the first identification information is associated with second identification information for identifying an application, an application to perform the service corresponding to the processing instruction; and causing the selected application to perform a process in accordance with the processing instruction.

A program for causing a computer to execute:

selecting, on the basis of first identification information included in a processing instruction and corresponding to a service, and first association information in which the first identification information is associated with second identification information for identifying an application, an application to perform the service corresponding to the processing instruction; and causing the selected application to perform a process in accordance with the processing instruction.

BRIEF DESCRIPTION OF THE DRAWINGS

FIG. 3 is an explanatory diagram showing an example of association information in accordance with this embodiment in which service type information is associated with first identification information;

FIG. 4 is an explanatory diagram showing an example of a processing instruction including first identification information in accordance with this embodiment;

FIG. 5 is an explanatory diagram showing an example of a processing instruction including first identification information in accordance with this embodiment;

FIG. 6 is an explanatory diagram showing an example of association information in accordance with this embodiment in which first identification information is associated with second identification information;

DETAILED DESCRIPTION OF THE EMBODIMENTS

Figure 1A:
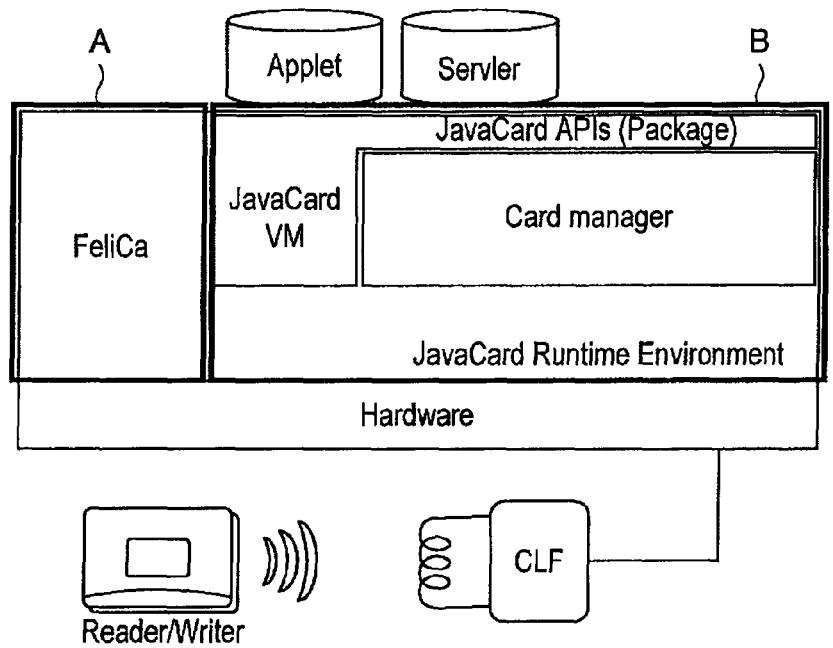
FIG. 1A is an explanatory diagram illustrating a process in accordance with an information processing method performed by an information processing device in accordance with this embodiment.

Hereinafter, preferred embodiments of the present disclosure will be described in detail with reference to the appended drawings. Note that, in this specification and the appended drawings, structural elements that have substantially the same function and structure are denoted by the same reference numerals, and repeated explanation of these structural elements is omitted.

Hereinafter, description will be made in the following order.

1. Information Processing Method in accordance with this Embodiment

2. Information Processing Device in accordance with this Embodiment

3. Program in accordance with this Embodiment (Information Processing Method in Accordance with this Embodiment)

Before describing the configuration of an information processing device in accordance with this embodiment, an information processing method in accordance with this embodiment will be described. Hereinafter, description will be made on the assumption that the information processing device in accordance with this embodiment performs a process in accordance with the information processing method in accordance with this embodiment.

Figure 1B:
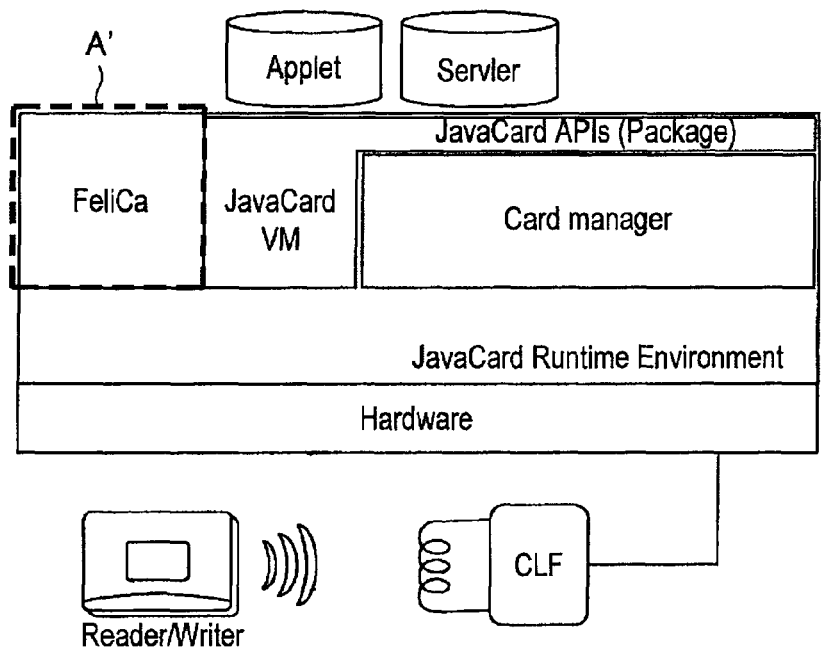
FIG. 1B is an explanatory diagram illustrating a process in accordance with an information processing method performed by an information processing device in accordance with this embodiment.

FIG. 1A and FIG. 1B are explanatory diagrams each illustrating a process in accordance with the information processing method performed by the information processing device in accordance with this embodiment. Herein, FIG. 1A shows an overview of a configuration corresponding to the aforementioned method of making an information processing device support a plurality of communication methods or communication standards, and FIG. 1B shows an overview of a configuration corresponding to the aforementioned another method of making an information processing device support a plurality of communication methods or communication standards.

For example, as shown in FIG. 1A, when an information processing device has two OSs: a "FeliCa® OS" (indicated by symbol A in FIG. 1A) and a "Java Card™ OS" (indicated by symbol B in FIG. 1A)," it becomes possible to cause a single information processing device to perform each of a process corresponding to a communication method supporting the "FeliCa® OS" and a process corresponding to a communication method supporting the "Java Card™ OS." However, in order to implement the configuration shown in FIG. 1A, two OSs: the "FeliCa® OS" and the "Java Card™ OS" should be mounted on the information processing device.

Examples of another method of making the information processing device support a plurality of communication methods or communication standards include a method in which, as shown in FIG. 1B, for example, the function of the "FeliCa® OS" (indicated by symbol A shown in FIG. 1A) is implemented by an application having a function supporting the "FeliCa® OS" (indicated by symbol A' in FIG. 1B)." In the example shown in FIG. 1B, the function of the "FeliCa® OS" (indicated by symbol A in FIG. 1A) is implemented on the "Java Card™ OS."

When the information processing device has a configuration in accordance with another method of making the information processing device support a plurality of communication methods or communication standards as shown in FIG. 1B, for example, it is desired that compatibility with the existing NFC communication systems be ensured on the information processing device side. This is because, as described above, readers/writers that allow NFC communication are widely spread in the society, and it is thus not easy to replace such widely spread readers/writers with new ones.

Herein, when the technology disclosed in JP 2011-118837A is used, for example, there is a possibility that a communication system can be implemented in which an information processing device that uses the aforementioned another method performs contactless communication with an external device such as a reader/writer, without replacing the reader/writer of the existing communication system with a new one. However, as described above, even when the technology disclosed in JP 2011-118837A, for example, is used, it may not be always possible to cause an application (e.g., an application indicated by symbol A' in FIG. 1B), which is capable of processing a processing instruction of a different communication method from a communication method supported by the OS, to perform a process corresponding to a processing instruction received from the external device.

[Overview of Information Processing Method in Accordance with this Embodiment]

Herein, the information processing device in accordance with this embodiment selects, on the basis of first identification information, which is included in a processing instruction transmitted from a reader/writer (an example of an external device), is provided to a file system of the information processing device, for example, and can also be used to identify a service or a service provider, selects an application to perform a process related to a service corresponding to the processing instruction (a selection process). Then, the information processing device in accordance with this embodiment causes the selected application to perform a process in accordance with the processing instruction (an execution process).

Herein, examples of the first identification information in accordance with this embodiment include IDm (manufacture ID) that the information processing device in accordance with this embodiment stores into ROM (Read Only Memory). The information processing device in accordance with this embodiment stores the IDm for each information processing device. Note that the first identification information in accordance with this embodiment is not limited to the IDm. For example, the information processing device in accordance with this embodiment can use as the first identification information data that can be transmitted to an external device in response to a received polling command and be included in a processing instruction transmitted from the external device. Hereinafter, description will be made on the assumption that the first identification information in accordance with this embodiment is IDm.

In addition, the information processing device in accordance with this embodiment, upon receiving a polling command (an example of a processing instruction) transmitted from a reader/writer, for example, identifies IDm (first identification information) that is included in the received polling command, is provided to the file system of the information processing device, for example, and corresponds to service type information capable of identifying the type of a service or the service provider. Then, the information processing device in accordance with this embodiment transmits a response signal, which includes the IDm corresponding to the service type information, in response to the polling command, to the reader/writer that has transmitted the polling command.

By receiving the response returned in response to the polling command, the reader/writer that has transmitted the polling command acquires the IDm (first identification information). In addition, in the existing communication system that performs NFC communication, the reader/writer transmits a processing instruction including IDm acquired through the transmission of a polling command.

Herein, when the communication between the reader/writer and the information processing device is interrupted for some reason, there is a possibility that the reader/writer of the existing communication system that performs NFC communication may resume the communication from the stage interrupted last time without re-transmitting a polling command. In the existing communication system that performs NFC communication, when the reader/writer resumes the communication from the stage interrupted last time, the reader/writer of the existing communication system that performs NFC communication transmits a processing instruction including IDm (first identification information).

Accordingly, even when the communication between the reader/writer of the existing communication system that performs NFC communication and the information processing device in accordance with this embodiment is interrupted for some reason, and the communication is resumed from the stage interrupted last time, the information processing device in accordance with this embodiment can perform the aforementioned selection process and execution process on the basis of a processing instruction transmitted from the reader/writer.

[Example of Process in Accordance with Information Processing Method in Accordance with this Embodiment]

Hereinafter, a process in accordance with the information processing method in accordance with this embodiment will be described more specifically. Note that hereinafter, description will be made of a process in accordance with the information processing method performed by the information processing device in accordance with this embodiment, with reference to an example in which the function of the "FeliCa® OS" (indicated by symbol A in FIG. 1A) is implemented on the "Java Care" OS" as shown in FIG. 1B, for example.

Figure 2:
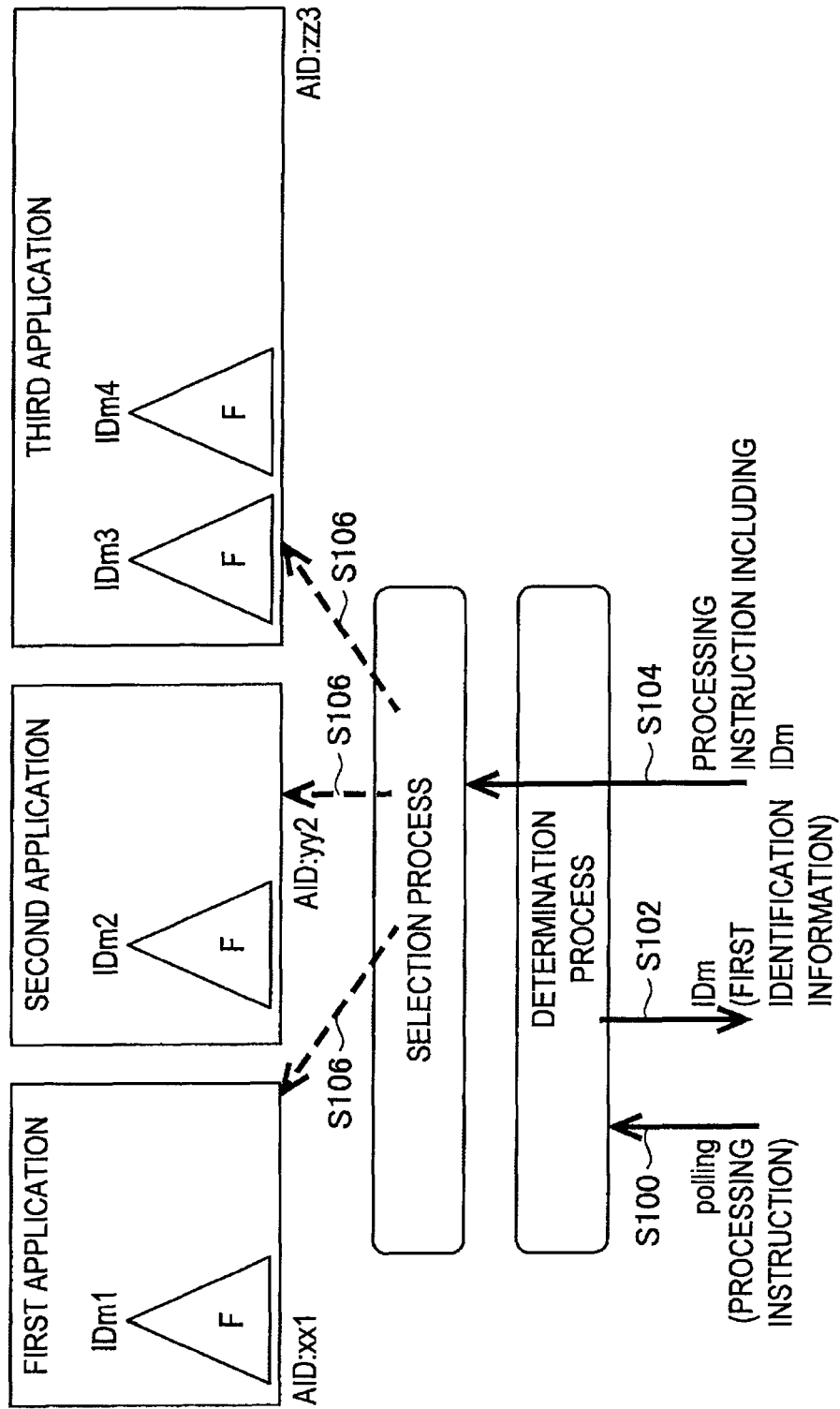
FIG. 2 is an explanatory diagram illustrating a process in accordance with an information processing method performed by an information processing device in accordance with this embodiment.

FIG. 2 is an explanatory diagram illustrating a process in accordance with the information processing method performed by the information processing device in accordance with this embodiment. Herein, symbol "F" shown in FIG. 2 indicates a file system. In addition, each IDm shown above each symbol "F" in FIG. 2 indicates the IDm provided to each file system. In addition, though not shown in FIG. 2, each file system shown in FIG. 2 has service identification information provided thereto. Note that hereinafter, an example in which an external device as a communication target that communicates with the information processing device in accordance with this embodiment is a reader/writer will be described.

(1) Determination Process

The information processing device in accordance with this embodiment determines a received processing instruction.

For example, upon receiving a polling command (an example of a processing instruction) transmitted from a reader/writer, the information processing device in accordance with this embodiment determines if the received polling command includes service type information indicating the type of a service.

When the received polling command includes service type information, the information processing device in accordance with this embodiment transmits IDm (first identification information) corresponding to the service type information included in the polling command to the reader/writer (S102).

Herein, the information processing device in accordance with this embodiment identifies the IDm (first identification information) corresponding to the service type information included in the polling command, using association information (second association information) in which the service type information is associated with the first identification information, for example. FIG. 3 is an explanatory diagram showing an example of the association information in accordance with this embodiment in which the service type information is associated with the first identification information, and shows an exemplary table in which the service type information (symbol A shown in FIG. 3) is associated with the IDm (first identification information, symbol B shown in FIG. 3).

The information processing device in accordance with this embodiment can uniquely identify IDm (first identification information) corresponding to the service type information included in the polling command received in step S100, that is, IDm (first identification information) corresponding to a service, using the table shown in FIG. 3, for example. Note that the association information (second association information) in accordance with this embodiment in which the service type information is associated with the first identification information is not limited to the example shown in FIG. 3, and may be any form as long as the service type information is associated with the first identification information.

(2) Selection Process

Referring again to FIG. 2, an example of a process in accordance with the information processing method in accordance with this embodiment performed by the information processing device in accordance with this embodiment will be described. Upon receiving a processing instruction including IDm (first identification information) transmitted from a reader/writer, the information processing device in accordance with this embodiment determines the received processing instruction (S104). More specifically, the information processing device in accordance with this embodiment determines if the received processing instruction includes IDm (first identification information).

FIGS. 4 and 5 are explanatory diagrams each showing an example of a processing instruction including the first identification information in accordance with this embodiment. For example, as shown in FIGS. 4 and 5, a processing instruction including IDm (first identification information) received by the information processing device in accordance with this embodiment does not always have the same structure. This is because a processing instruction including the IDm can include a subcommand in some cases.

The information processing device in accordance with this embodiment reads the first 1 byte corresponding to "a command code (hereinafter referred to as "CC")" portion in the received processing instruction including IDm, for example, and determines the head of the IDm in the processing instruction on the basis of a character string of the read first 1 byte. More specifically, the information processing device in accordance with this embodiment, if the first 1 byte of the read "CC" portion does not indicate a prescribed character string, determines that the processing instruction has the structure shown in FIG. 4. Meanwhile, the information processing device in accordance with this embodiment, if the first 1 byte of the read "CC" portion indicates a prescribed character string, determines that the processing instruction has the structure shown in FIG. 5, and then shifts the head of the IDm in the processing instruction by 1 byte from when the processing instruction is determined to have the structure shown in FIG. 4. Note that the aforementioned designation of the determined position can be adjusted dynamically as described above, for example, but it is also possible to designate the value statically.

The information processing device in accordance with this embodiment, by determining the head of the IDm in the processing instruction as described above, for example, determines if the processing instruction includes the IDm (first identification information). Note that it is needless to mention that the method of determining if the processing instruction includes the IDm (first identification information) with the information processing device in accordance with this embodiment is not limited to the aforementioned example.

Examples of the timing of performing determination using a command including the IDm include performing determination only when a processing instruction is transmitted first time or n-th (n is any given number) time after an information processing device such as a card is booted, for example, and performing determination each time. The timing of the aforementioned determination may be set in the information processing device in accordance with this embodiment in advance, or set (changed) thereafter.

In addition, in determining each command including the service type information and the IDm, it is possible to narrow down whether the command is the target command on the basis of the value of CC shown in FIG. 4, and in such a case, the number of processes performed can be efficiently reduced. For example, when the command is the aforementioned polling command, the information processing device in accordance with this embodiment can use only the service type information as the target to be determined.

Referring again to FIG. 2, an example of a process in accordance with the information processing method in accordance with this embodiment performed by the information processing device in accordance with this embodiment will be described. When the received processing instruction is determined to include the IDm (first identification information) in step S104, the information processing device in accordance with this embodiment selects an application corresponding to the processing instruction on the basis of the IDm (first identification information) included in the processing instruction.

More specifically, the information processing device in accordance with this embodiment, on the basis of association information (first association information) in which the first identification information is associated with second identification information for identifying an application, selects an application corresponding to the processing instruction. FIG. 6 is an explanatory diagram showing an example of the association information in accordance with this embodiment in which the first identification information is associated with the second identification information, and shows an exemplary table in which the IDm (first identification information, indicated by symbol A shown in FIG. 6) is associated with the second association information (indicated by symbol B shown in FIG. 6). Examples of the second identification information in accordance with this embodiment include an application-specific ID (hereinafter referred to as "AID") as shown in FIG. 6, for example. Hereinafter, an example in which the second identification information in accordance with this embodiment is AID will be described.

The information processing device in accordance with this embodiment can, using the table shown in FIG. 6, for example, uniquely identify the second identification information corresponding to the IDm (first identification information) included in the processing instruction received in step S104. Note that the association information (first association information) in accordance with this embodiment in which the first identification information is associated with the second identification information is not limited to the example shown in FIG. 6, and may be any form as long as the first identification information is associated with the second identification information.

When the information processing device in accordance with this embodiment selects an application corresponding to a processing instruction, the information processing device maintains a state in which the selected application is being selected, for example. By maintaining the state in which the application is being selected, for example, it becomes possible to, when the reader/writer sequentially transmits processing instructions, cause the selected application to perform a process without sequentially performing the process (2) (selection process). Herein, the state in which the selected application is being selected is maintained while the power is on, for example. In addition, when information is held while the selected application is being selected, there is a possibility that the held information may be lost when the power is turned off.

When the information processing device in accordance with this embodiment has a configuration shown in FIG. 1B, for example, the process (2) (selection process) can be realized using a "Reorganization Algorithm" in the CRS of the "Java Card Runtime Environment" shown in FIG. 1B. Note that it is needless to mention that the method of implementing the process (2) (selection process) of the information processing device in accordance with this embodiment is not limited to the aforementioned example.

(3) Execution Process

Referring again to FIG. 2, an example of a process in accordance with the information processing method in accordance with this embodiment performed by the information processing device in accordance with this embodiment will be described. The information processing device in accordance with this embodiment causes the application selected in the aforementioned process (2) to perform a process in accordance with the processing instruction (S106). More specifically, the information processing device in accordance with this embodiment starts an application having AID that matches the AID (second identification information) indicating the application selected in the aforementioned process (2), and causes the started application to perform a process in accordance with the processing instruction. For example, upon receiving a processing instruction including IDm2, the information processing device in accordance with this embodiment causes the second application selected in the aforementioned process (2) to process the processing instruction including the IDm2.

The information processing device in accordance with this embodiment, as a process in accordance with the information processing method in accordance with this embodiment, performs the aforementioned process (1) (determination process) to the aforementioned process (3) (selection process). In the aforementioned process (2) (selection process), the information processing device in accordance with this embodiment, on the basis of IDm (first identification information) included in the processing instruction transmitted from a reader/writer, selects an application to perform a process corresponding to the processing instruction. Then, the information processing device in accordance with this embodiment, in the aforementioned process (3) (execution process), causes the selected application to perform a process in accordance with the processing instruction.

Herein, the IDm (first identification information) included in the processing instruction transmitted from the reader/writer has been acquired by the reader/writer from the information processing device in accordance with this embodiment as a polling command has been transmitted from the reader/writer and the aforementioned process (1) (determination process) has been performed with the information processing device in accordance with this embodiment. In addition, the process related to a polling command between the reader/writer and the information processing device in accordance with this embodiment is also performed in the existing communication system that performs NFC communication. Further, the reader/writer of the existing communication system transmits a processing instruction including the Dm (first identification information) to the target communication device. That is, even when the information processing device in accordance with this embodiment receives a processing instruction transmitted from the reader/writer of the existing communication system, the information processing device can perform a process in accordance with the information processing method in accordance with this embodiment on the basis of the received processing instruction.

Accordingly, a communication system having the information processing device in accordance with this embodiment need not replace the reader/writer of the existing communication system with a new one.

When the communication between the reader/writer and the information processing device is interrupted for some reason, there is a possibility that the reader/writer of the existing communication system that performs NFC communication may resume the communication from the stage interrupted last time without re-transmitting a polling command. Herein, in the existing communication system that performs NFC communication, when the reader/writer resumes the communication from the stage interrupted last time, the reader/writer of the existing communication system that performs NFC communication transmits a processing instruction including IDm (first identification information). That is, the information processing device in accordance with this embodiment can, without depending on whether or not the communication between the reader/writer of the existing communication system that performs NFC communication and the information processing device in accordance with this embodiment is interrupted, receive a processing instruction including IDm (first identification information) and perform a process in accordance with the information processing method in accordance with this embodiment.

Accordingly, when the information processing device in accordance with this embodiment has a configuration in accordance with another method of making the information processing device support a plurality of communication methods or communication standards described above as shown in FIG. 1B, for example, it becomes possible to further increase the possibility that the information processing device in accordance with this embodiment can perform a process corresponding to a processing instruction more normally than can the information processing device to which the technology described in JP 2011-118837A is applied.

Thus, the information processing device in accordance with this embodiment can cause an application, which is capable of processing a processing instruction of a different communication method from a communication method supported by an operating system, to perform a process corresponding to a processing instruction received from an external device.

Note that a process in accordance with the information processing method in accordance with this embodiment performed by the information processing device in accordance with this embodiment is not limited to the aforementioned example. When the communication between the reader/writer and the information processing device is interrupted for some reason, there is a possibility that the reader/writer may resume the communication from the stage interrupted last time without re-transmitting a polling command. In such a case, the information processing device in accordance with this embodiment performs the aforementioned process (2) (selection process) and the aforementioned process (3) (execution process) as a process in accordance with the information processing method in accordance with this embodiment.

Further, as shown in FIG. 2, for example, when there exists a plurality of applications (e.g., Java Card™ Applet) and there also exists a plurality of file systems, the information processing device in accordance with this embodiment can switch between the file systems. Hereinafter, an example of a process performed by the information processing device in accordance with this embodiment, which can switch between the file systems while ensuring high security, will be described. Note that hereinafter, an example will be described in which the information processing device in accordance with this embodiment has a selection unit (described below) that plays a leading role in performing the aforementioned process (2) (selection process) and an execution unit (described below) that plays a leading role in performing the aforementioned process (3)(execution process).

[13] First Example of Switching Process

Figure 7:
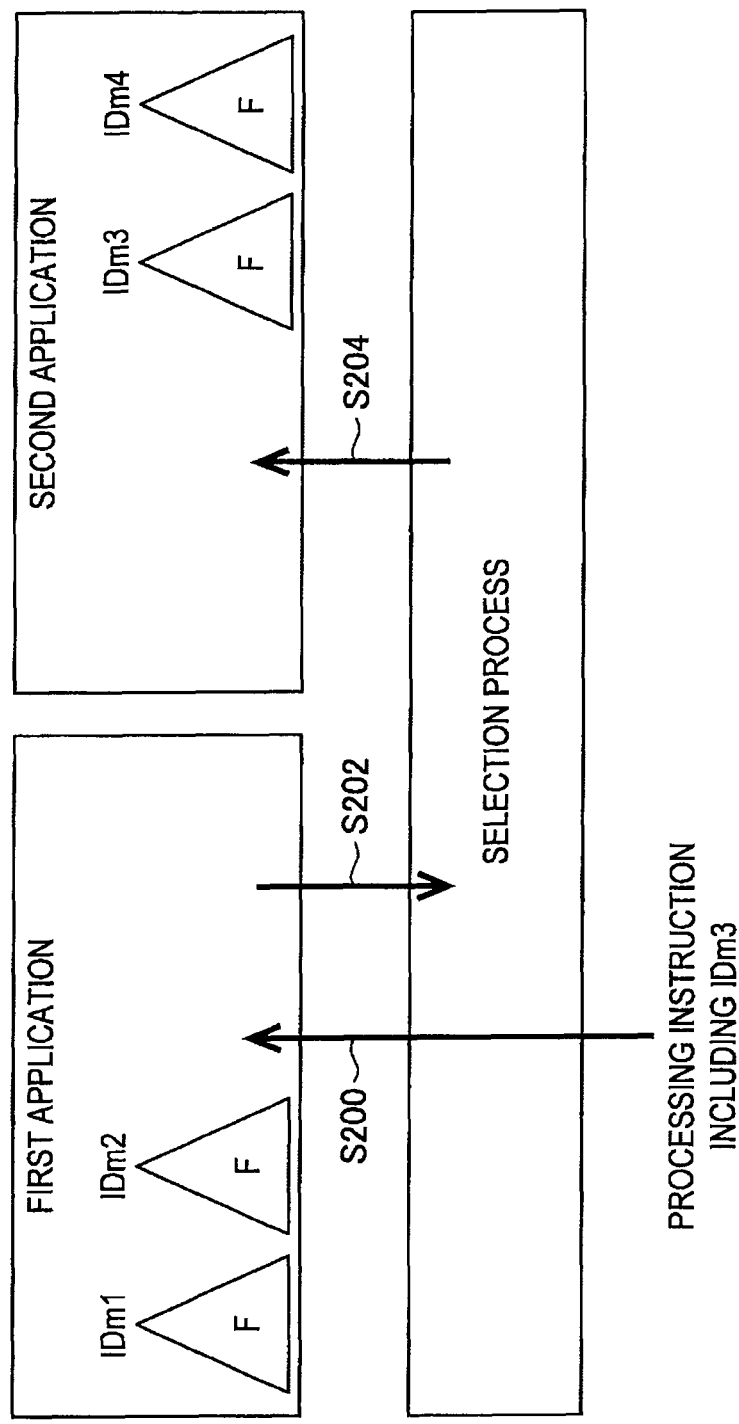
FIG. 7 is an explanatory diagram showing an example of a switching process performed by an information processing device in accordance with this embodiment.

FIG. 7 is an explanatory diagram showing an example of a switching process performed by the information processing device in accordance with this embodiment. FIG. 7 shows an example in which a first application is selected by the selection unit (described below) in accordance with this embodiment.

Upon receiving a processing instruction including IDm3, the execution unit (described below) in accordance with this embodiment attempts to cause the selected first application to execute a process in accordance with the processing instruction (S200). Herein, in the example shown in FIG. 7, the first application does not have a file system corresponding to the IDm3 included in the processing instruction.

As described above, when the selected application is not an application corresponding to the processing instruction, the execution unit (described below) in accordance with this embodiment transmits a selection request to the selection unit (described below) in accordance with this embodiment to select again an application corresponding to the processing instruction (S202). Herein, the selection request in accordance with this embodiment includes, for example, IDm (first identification information) included in the processing instruction and AID (second identification information) indicating the selected application. Note that the selection request in accordance with this embodiment is not limited to the aforementioned example. For example, the selection request in accordance with this embodiment may be IDm (first identification information) included in the processing instruction.

When the selection request is transmitted, the selection unit (described below) in accordance with this embodiment selects again an application corresponding to the processing instruction on the basis of the IDm (first identification information) included in the processing instruction and association information (first association information) in which the first identification information is associated with the second identification information. Then, the execution unit (described below) in accordance with this embodiment causes the re-selected application to perform a process in accordance with the processing instruction (S204). FIG. 7 shows an example in which a second application including a file system of IDm3 is selected by the selection unit (described below) in accordance with this embodiment, and then the execution unit (described below) in accordance with this embodiment causes the second application to perform a process in accordance with processing instruction.

Herein, for example, when the selection request is the IDm (first identification information) included in the processing instruction, the selection unit (described below) in accordance with this embodiment selects again an application corresponding to the processing instruction by identifying AID (second identification information) corresponding to the IDm (first identification information) indicated by the selection request, from the association information (first association information in which the first identification information is associated with the second identification information).

As described above, when a selection request transmitted from an application to the selection unit in accordance with this embodiment is the IDm (first identification information) included in the processing instruction, the AID (second identification information) is hidden. Herein, the selection unit (described below) in accordance with this embodiment can, if the IDm (first identification information) included in the processing instruction is known, select an application corresponding to the processing instruction by performing the process (2) (selection process) using the association information (first association information) in which the first identification information is associated with the second identification information. Meanwhile, for example, units other than the selection unit (described below) in accordance with this embodiment, such as other applications, cannot select an application corresponding to the processing instruction even if such units are able to acquire the IDm (first identification information) included in the processing instruction.

Accordingly, when the selection request is the IDm (first identification information) included in the processing instruction, unauthorized transfer of the processing instruction to other applications or unauthorized execution of other applications can be avoided within the information processing device in accordance with this embodiment. Thus, the information processing device in accordance with this embodiment can switch between the file systems while ensuring high security by preventing an event such as lowered security like impersonation, for example.

Meanwhile, when the selection request includes AID (second identification information) indicating the selected application, for example, the selection unit (described below) in accordance with this embodiment selects, as the application to be selected, AID (second identification information) that satisfies predetermined conditions in relation to the AID (second identification information) included in the selection request, among the AID (second identification information) included in the association information (first association information) in which the first identification information is associated with the second identification information. Examples of the predetermined conditions herein include conditions of checking for a partial match of the AID such as whether the head 5 bytes of the AID (second identification information) match. By setting the conditions of checking for a partial match of the AID, for example, it becomes possible to select an application in accordance with a service provided by the associated service provider. Note that it is needless to mention that the predetermined conditions in accordance with this embodiment are not limited to the aforementioned examples.

When the selection request includes the AID (second identification information) indicating the selected application, the selection unit (described below) in accordance with this embodiment can select, as the application to be selected, not only an application having the matching AID (second identification information) but also an application having AID (second identification information) that satisfies predetermined conditions. As described above, by selecting an application having AID (second identification information) that satisfies predetermined conditions as the application to be selected, it becomes possible to switch between the file systems while ensuring high security by limiting the range of other applications to which the processing instruction can be transferred.

[2] Second Example of Switching Process

Note that the switching process of the information processing device in accordance with this embodiment is not limited to the first example. For example, in the information processing device in accordance with this embodiment, the execution unit (described below) in accordance with this embodiment can also perform a switching process. The execution unit (described below) in accordance with this embodiment, if the selected application is not an application corresponding to the processing instruction, determines if an application related to the selected application can perform a process in accordance with the processing instruction. Then, the execution unit (described below) in accordance with this embodiment causes an application, which is determined to be capable of performing a process in accordance with the processing instruction, to perform a process in accordance with the processing instruction.

More specifically, examples of the switching process in accordance with the second example performed by the information processing device in accordance with this embodiment include the following methods (a) to (c), for example.

(a) Method of Using Security on GP (Global Platform)

The execution unit (described below) in accordance with this embodiment, for example, calls up (selects) an application from among applications having privileges to cause it to perform a process corresponding to a processing instruction.

(b) First Method of Using Security on JCRE (Java Card Runtime Environment)

The execution unit (described below) in accordance with this embodiment permits, for example, only an application that is an instance generated from the same package as the selected application (requesting application) to be called up. Then, the execution unit (described below) in accordance with this embodiment causes the called-up application (selected application) to perform a process corresponding to the processing instruction.

(c) Second Method Using Security on JCRE

The execution unit (described below) in accordance with this embodiment permits only applications that have a server-client relationship (i.e., having sharable objects) with the selected application (requesting application), for example, to be called up. Then, the execution unit (described below) in accordance with this embodiment causes the called-up application (selected application) to perform a process corresponding to the processing instruction.

(Information Processing Device in Accordance with this Embodiment)

Figure 8:
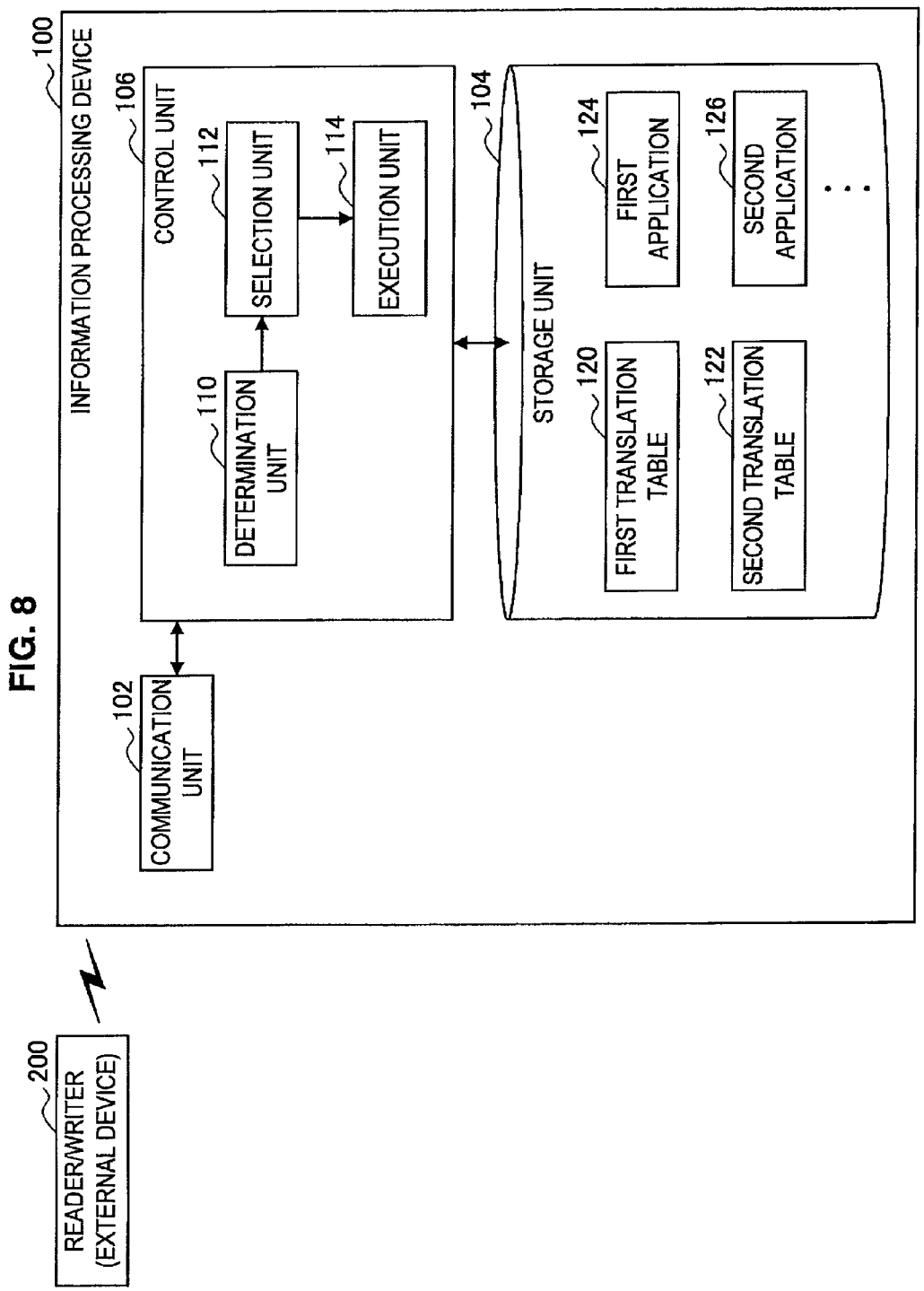
FIG. 8 is a block diagram showing an exemplary configuration of an information processing device in accordance with this embodiment.

Next, an exemplary configuration of the information processing device in accordance with this embodiment that can perform a process in accordance with the information processing method in accordance with the aforementioned embodiment will be described. FIG. 8 is a block diagram showing an exemplary configuration of the information processing device 100 in accordance with this embodiment. FIG. 8 also shows a reader/writer 200 (an example of an external device) that performs contactless communication with the information processing device 100.

The information processing device 100 includes, for example, a communication unit 102, a storage unit 104, and a control unit 106.

The information processing device 100 may also include, for example, ROM (not shown), RAM (Random Access Memory, not shown), an operation unit (not shown) operable by a user, and a display unit (not shown) that displays various screens on the display screen. The information processing device 100 connects such components with a bus as a data transmission channel.

Herein, the ROM (not shown) stores control data such as programs and operation parameters used by the control unit 106. The RAM (not shown) temporarily stores programs and the like executed by the control unit 106.

Examples of the operation unit (not shown) include, for example, a button, a direction key, rotary selector such as a jog dial, and a combination of them. In addition, the information processing device 100 can also connect to an operation input device (e.g., a keyboard or a mouse) as an external device of the information processing device 100, for example.

Examples of the display unit (not shown) include a liquid crystal display (LCD) and an organic EL display (an organic ElectroLuminescence display, or also referred to as an OLED display (Organic Light Emitting Diode display)). The display unit (not shown) may be a device that can display information and be operated by a user, such as a touch screen, for example. The information processing device 100 can, regardless of the presence or absence of the display unit (not shown), connect to a display device (e.g., an external display) as an external device of the information processing device 100.

[Exemplary Hardware Configuration of the Information Processing Device 100]

Figure 9:
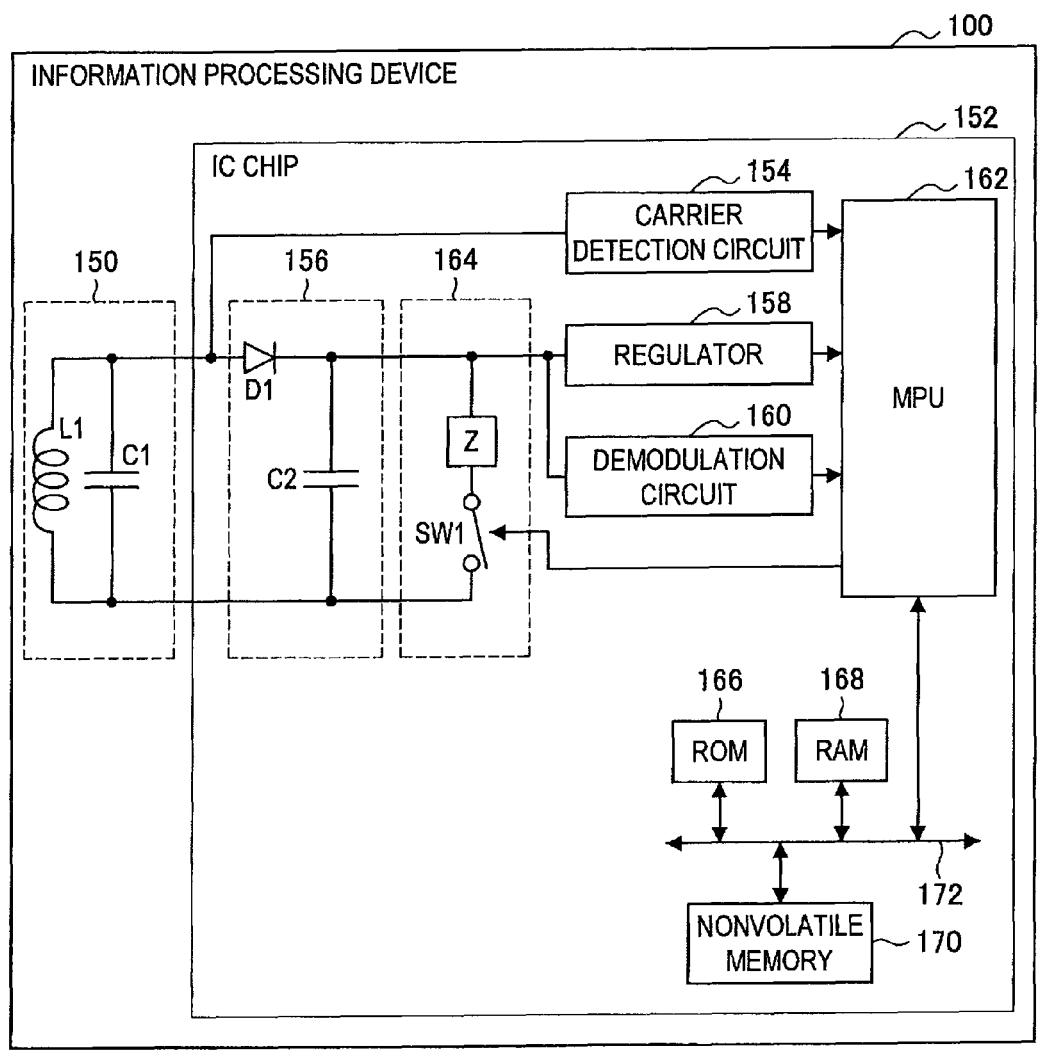
FIG. 9 is an explanatory diagram showing an exemplary configuration of an information processing device in accordance with this embodiment.

FIG. 9 is an explanatory diagram showing an exemplary configuration of the information processing device 100 in accordance with this embodiment. Herein, FIG. 9 shows an exemplary configuration in which the information processing device 100 is an IC card.

The information processing device 100 includes a communication antenna 150 capable of receiving a carrier wave, and an IC chip 152 that demodulates and processes a carrier signal on the basis of the received carrier wave, and causes a response signal to be transmitted through load modulation. Note that in the information processing device 100 in accordance with this embodiment, the configuration of the IC chip 152 need not be in the form of an IC chip.

The communication antenna 150 functions as the communication unit 102. The communication antenna 150 is constructed from a resonant circuit including, for example, a coil (inductor) L1 having predetermined inductance and a capacitor C1 having predetermined capacitance, and generates an induced voltage through electromagnetic induction in response to the reception of a carrier wave. Then, the communication antenna 150 outputs a received voltage obtained by resonating the induced voltage at a predetermined resonance frequency. Herein, the resonance frequency at the communication antenna 150 is set in accordance with the frequency of a carrier wave such as 13.56 MHz, for example. The communication antenna 150, with the aforementioned configuration, receives a carrier wave, and transmits a response signal through load modulation performed at a load modulation circuit 164 of the IC chip 152.

The IC chip 152 includes a carrier detection circuit 154, a detection circuit 156, a regulator 158, a demodulation circuit 160, a MPU 162, and a load modulation circuit 164. Though not shown in FIG. 9, the IC chip 152 may further include a protection circuit (not shown) for preventing overvoltage or overcurrent from being applied to the MPU 160, for example. Herein, examples of the protection circuit (not shown) include a clamp circuit including diodes and the like.

The IC chip 152 includes, for example, ROM 166, RAM 168, and nonvolatile memory 170. The MPU 162, the ROM 166, the RAM 168, and the nonvolatile memory 170 are connected with a bus 172 as a data transmission channel, for example.

The ROM 166 stores control data such as programs and operation parameters used by the MPU 162. The RAM 168 temporarily stores programs, operation results, execution state, and the like executed by the MPU 162.

The nonvolatile memory 170 functions as the storage unit 104, and stores various data such as association information (first association information) in which the first identification information is associated with the second identification information, association information (second association information) in which the service type information is associated with the first identification information, and applications. Examples of the recording medium 156 include EEPROM (Electrically Erasable and Programmable Read Only Memory) and flash memory.

The carrier detection circuit 154, on the basis of the received voltage transmitted from the communication antenna 150, generates a rectangular detection signal, and transmits the detection signal to the MPU 162. In addition, the MPU 162 uses the transmitted detection signal as a processing clock for data processing, for example. Herein, as the detection signal is based on the received voltage transmitted from the communication antenna 150, the detection signal is synchronized with the frequency of a carrier wave transmitted from the reader/writer 200. Thus, the IC chip 152 can, by having the carrier detection circuit 154, perform the process between the information processing device 100 and the reader/writer 200 in synchronization with the reader/writer 200.

The detection circuit 156 rectifies the received voltage output from the communication antenna 150. Herein, the detection circuit 156 includes a diode D1 and a capacitor C2, for example.

The regulator 158 smoothes and regulates the received voltage, and outputs the drive voltage to the MPU 162. Herein, the regulator 158 uses the direct-current components of the received voltage as the drive voltage.

The demodulation circuit 160 demodulates the carrier signal on the basis of the received voltage, and outputs data corresponding to the carrier signal included in the carrier wave (e.g., data signals with binary values of high level and low level). Herein, the demodulation circuit 160 outputs the alternating-current components of the received voltage as data.

The MPU 162 drives the drive voltage output from the regulator 158 as power, and processes the data demodulated by the demodulation circuit 160. In addition, the MPU 162, in the information processing device 100, functions as the control unit 106 that controls the entire information processing device 100, and serves as, for example, the determination unit 110, the selection unit 112, and the execution unit 114 described below. Herein, the MPU 162 includes, for example, a MPU (Micro Processing Unit), various processing circuits, and the like.

The MPU 162 selectively generates a control signal for controlling the load modulation related to a response to the reader/writer 299, in accordance with the processing result. Then, the MPU 162 selectively outputs the control signal to the load modulation circuit 164.

The load modulation circuit 164 includes, for example, a load Z and a switch SW1, and performs load modulation by selectively connecting (activating) the load Z in accordance with a control signal transmitted from the MPU 162. Herein, the load Z includes, for example, a resistor with a predetermined resistance value. In addition, the switch SW1 includes, for example, a p-channel MOSFET (Metal Oxide Semiconductor Field Effect Transistor) or an n-channel MOSFET.

The IC chip 152 can, with the aforementioned configuration, process a carrier signal received with the communication antenna 150, and cause a response signal to be transmitted to the communication antenna 150 through load modulation.

The information processing device 100, by having the configuration shown in FIG. 9, for example, performs contactless communication with the reader/writer 200 using a carrier wave while performing the information processing method in accordance with this embodiment.

Note that the hardware configuration of the information processing device 100 in accordance with this embodiment is not limited to the configuration shown in FIG. 9. For example, the information processing device 100 in accordance with this embodiment may further include a communication device that communicates with an external device such as a server wirelessly/by wire via a network (or directly). Examples of the communication device include a communication antenna and an RF (Radio Frequency) circuit (wireless communication); an IEEE 802.15.1 port and a transmitting/receiving circuit (wireless communication); an IEEE 802.11b port and a transmitting/receiving circuit (wireless communication); and a LAN (Local Area Network) terminal and a transmitting/receiving circuit (wire communication).

Referring again to FIG. 8, an exemplary configuration of the information processing device 100 will be described. The communication unit 102 is a communication means of the information processing device 100, and performs contactless communication with an external device such as the reader/writer 200, using a carrier wave with a predetermined frequency such as 13.56 MHz, for example. In addition, communication of the communication unit 102 is controlled by the control unit 106, for example. Examples of the communication unit 102 include the communication antenna 150 shown in FIG. 9, for example.

The storage unit 104 is a storage means of the information processing device 100, and stores various data such as association information (first association information) in which the first identification information is associated with the second identification information, association information (second association information) in which the service type information is associated with the first identification information, and applications. FIG. 8 shows an example in which a first translation table 120 (which corresponds to the first association information) in which the IDm (first identification information) is associated with the AID (second identification information), a second translation table 122 (which corresponds to the second association information) in which the SC (service type information) is associated with the IDm (first identification information), a first application 124, and a second application 126 . . . are stored in the storage unit 104.

Herein, examples of the storage unit (not shown) include a magnetic recording medium such as a hard disk and nonvolatile memory such as flash memory. In addition, the storage unit 104 may be, for example, a tamper-resistant recording medium provided in an IC chip that can perform contactless communication with a reader/writer (or a device having reader/writer functions) that transmits a carrier wave with a predetermined frequency such as 13.56 MHz, for example. Further, the storage medium 104 may be configured to be removable from the information processing device 100.

The control unit 106 includes, for example, a MPU, and serves the function of controlling the entire information processing device 100. In addition, the control unit 106 includes, for example, the determination unit 110, the selection unit 112, and the execution unit 114, and plays a leading role in performing a process in accordance with the information processing method in accordance with this embodiment.

The determination unit 110 plays a leading role in performing the aforementioned process (1) (determination process), and determines the received processing instruction. More specifically, the determination unit 110, for example, determines if the received processing instruction includes service type information, using a table (an example of the second association information) such as the one shown in FIG. 3. When the received processing instruction includes service type information, the determination unit 110 causes the communication unit 102 to return a response including the IDm (first identification information) corresponding to the service type information included in the processing instruction. Meanwhile, even when the received processing instruction does not include service type information, the determination unit 110 transmits the processing instruction to the selection unit 112.

The selection unit 112 plays a leading role in performing the aforementioned process (2) (selection process), and selects an application to perform a process related to a service corresponding to the received processing instruction. More specifically, the selection unit 112 selects an application to perform a process related to a service corresponding to the processing instruction, using a table such as the one shown in FIG. 6 (an example of the first association information), for example.

The execution unit 114 plays a leading role in performing the aforementioned process (3) (execution process), and causes the application selected by the selection unit 112 to perform a process in accordance with the received processing instruction.

The control unit 106, by having the determination unit 110, the selection unit 112, and the execution unit 114, for example, plays a leading role in performing a process in accordance with the information processing method in accordance with this embodiment.

Note that a process in accordance with the information processing method in accordance with this embodiment performed by the control unit 106 in accordance with this embodiment is not limited to the aforementioned example. For example, the selection unit 112 and the execution unit 114 can, by cooperatively performing a process, perform a switching process in accordance with the aforementioned first example. In addition, the execution unit 114 may perform, for example, a switching process in accordance with the aforementioned second example.

The information processing device 100, with the configuration shown in FIG. 8, for example, performs a process in accordance with the information processing method in accordance with this embodiment (e.g., the process (1) (determination process) to the process (3) (execution process), or the process (2) (selection process) and the process (3) (execution process)). Thus, the information processing device 100 can, with the configuration shown in FIG. 8, for example, cause an application, which is capable of processing a processing instruction of a different communication method from a communication method supported by an operating system, to perform a process corresponding to a processing instruction received from an external device.

Note that the configuration of the information processing device in accordance with this embodiment is not limited to the configuration shown in FIG. 8. For example, the information processing device in accordance with this embodiment can have a configuration without the determination unit 110, that is, the information processing device in accordance with this embodiment can have a configuration for performing, as a process in accordance with the information processing method in accordance with this embodiment, the aforementioned process (2) (selection process) and the aforementioned process (3) (execution process). In such a case, the information processing device in accordance with this embodiment may, for example, perform a process in cooperation with another device or circuit that performs the aforementioned process (1) (determination process). In addition, the information processing device in accordance with this embodiment need not have the communication unit 102, and in such a case, may perform a process in cooperation with another device or circuit that serves as the communication unit 102.

[Example of Process Performed by Information Processing Device 100]

Figure 10:
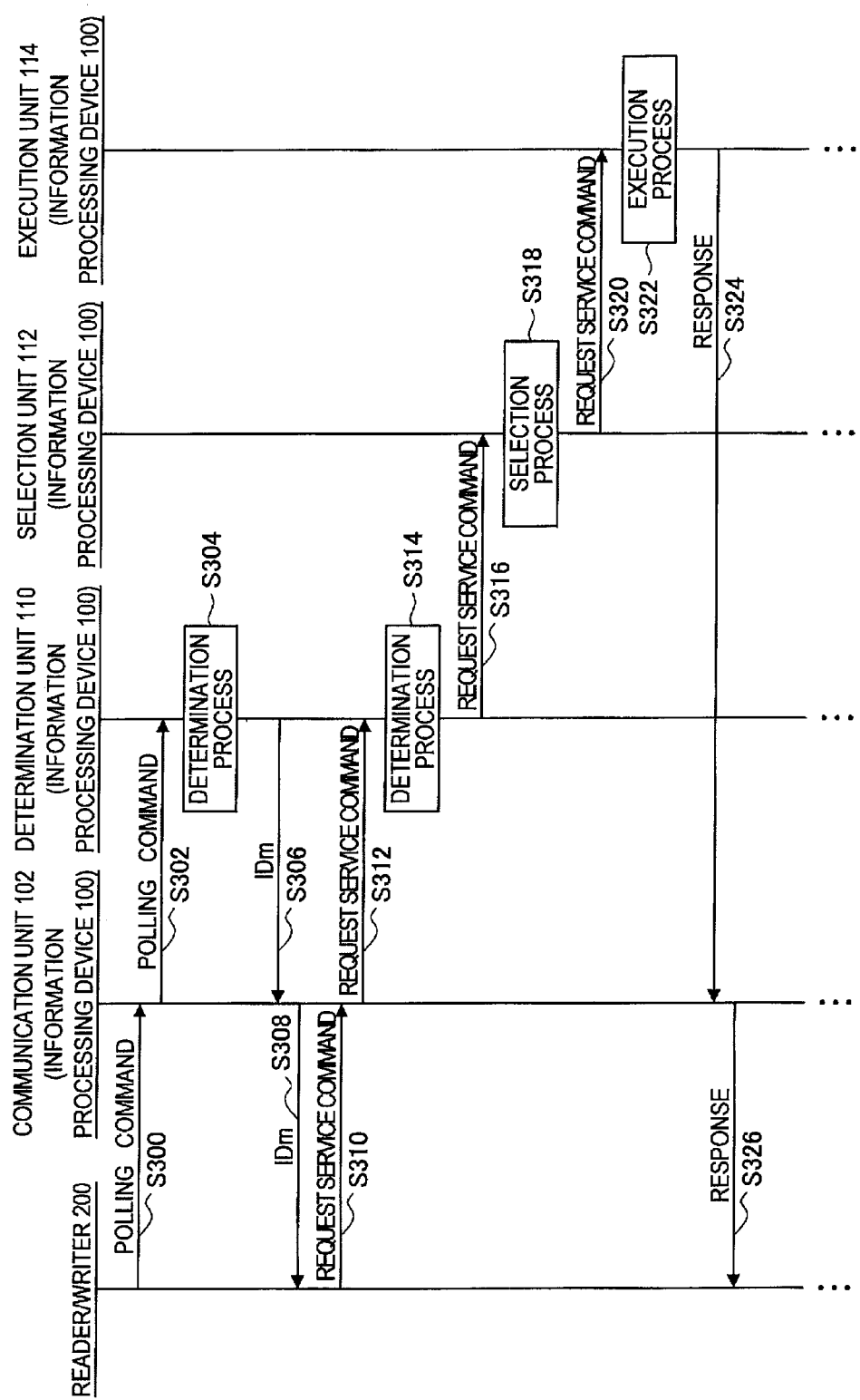
FIG. 10 is an explanatory diagram showing an example of a process performed by an information processing device in accordance with this embodiment.

Herein, an example of a process performed by the information processing device 100 will be described. FIG. 10 is an explanatory diagram showing an example of a process performed by the information processing device 100 in accordance with this embodiment. FIG. 10 shows an example of a process when the information processing device 100 performs contactless communication with the reader/writer 200 shown in FIG. 8.

The reader/writer 200 transmits a polling command ("Polling command" shown in FIG. 10, an example of a processing instruction) including service type information (e.g., indicated by symbol SC shown in FIG. 3) (S300).

The communication unit 102, upon receiving the polling command transmitted from the reader/writer 200 in step S300, transmits the received polling command to the determination unit 110 (S302).

The determination unit 110 performs the aforementioned process (1) (determination process) on the polling command transmitted in step S302 (S304). In addition, the determination unit 110 may, for example, perform a process such as CRC (cyclic redundancy check). Herein, the polling command includes service type information (e.g., symbol SC shown in FIG. 3). Accordingly, the determination unit 110 transmits to the communication unit 102 IDm (first identification information) corresponding to the service type information included in the polling command (S306).

The communication unit 102 transmits the IDm (first identification information) transmitted in step S306 as a response corresponding to the polling command transmitted from the reader/writer 200 in step S300 (S308).

The reader/writer 200, upon receiving the IDm (first identification information) transmitted from the information processing device 100 in step S308, transmits a processing instruction ("Request Service command" shown in FIG. 10) including the received IDm (first identification information) to the information processing device 100 (S310).

Though not shown in FIG. 10, after the reader/writer 200 receives the IDm (first identification information) in step S308, if the communication between the reader/writer 200 and the information processing device 100 is interrupted for some reason, the reader/writer 200 can perform the process of from step S310 without performing the process form step S300 again.

The communication unit 102, upon receiving the processing instruction transmitted from the reader/writer 200 in step S310, transmits the received processing instruction to the determination unit 110 (S312).

The determination unit 110 performs the aforementioned process (1) (determination process) on the processing instruction transmitted in step S312 (S314). Herein, the processing instruction does not include the service type information (e.g., symbol SC shown in FIG. 3). Accordingly, the determination unit 110 transmits the processing instruction to the selection unit 112 (S316).

The selection unit 112 performs the aforementioned process (2) (selection process) on the processing instruction transmitted in step S316 (S318). Then, the selection unit 112, for example, transmits to the execution unit 114 the processing instruction and AID (second identification information) indicating the selected application (S320).

The execution unit 114 performs the aforementioned process (3) (execution process), and causes the selected application to execute the processing instruction transmitted in step S320 (S322). Then, the execution unit 114, for example, transmits a response signal indicating the processing result to the communication unit 102 (S324).

The communication unit 102 transmits the response signal transmitted in step S324 as a response corresponding to the processing instruction transmitted from the reader/writer 200 in step S310 (S326).

If the reader/writer 200, which has received the response signal transmitted from the information processing device 100 in step S326, further transmits a processing instruction to the information processing device 100, the reader/writer 200 transmits the processing instruction to the information processing device 100 as in step S310. Then, the information processing device 100 again performs processes similar to those in steps S312 to S326.

When the information processing device 100 receives a processing instruction transmitted from the reader/writer 200, the information processing device 100 performs the process shown in FIG. 10, for example. Note that it is needless to mention that a process in accordance with the information processing method in accordance with this embodiment performed by the information processing device 100 in accordance with this embodiment is not limited to the process shown in FIG. 10.

As described above, the information processing device in accordance with this embodiment performs, as a process in accordance with the information processing method in accordance with this embodiment, the aforementioned process (1) (determination process) to the aforementioned process (3) (execution process), or the aforementioned process (2) (selection process) and the aforementioned process (3) (execution process), for example. In the aforementioned process (2) (selection process), the information processing device in accordance with this embodiment, on the basis of IDm (first identification information) included in a processing instruction transmitted from a reader/writer, selects an application to perform a process related to a service corresponding to the processing instruction. Then, the information processing device in accordance with this embodiment, in the aforementioned process (3) (execution process), causes the selected application to perform a process in accordance with the processing instruction.

Herein, the IDm (first identification information) included in the processing instruction transmitted from the reader/writer has been acquired by the reader/writer from the information processing device in accordance with this embodiment as the aforementioned process (1) (determination process) has been performed with the information processing device in accordance with this embodiment. In addition, a process related to a polling command between the reader/writer and the information processing device in accordance with this embodiment is also performed by the existing communication system that performs NFC communication. Further, the reader/writer of the existing communication system transmits a processing instruction including the IDm (first identification information) to a communication target device. That is, even when the information processing device in accordance with this embodiment receives a processing instruction transmitted from the reader/writer of the existing communication system, the information processing device can perform a process in accordance with the information processing method in accordance with this embodiment on the basis of the received processing instruction.

Accordingly, in a communication system having the information processing device in accordance with this embodiment, the reader/writer of the existing communication system need not be replaced with a new one.

When the communication between the reader/writer and the information processing device is interrupted for some reason, there is a possibility that the reader/writer of the existing communication system that performs NFC communication may resume the communication from the stage interrupted last time without re-transmitting a polling command. Herein, in the existing communication system that performs NFC communication, when the reader/writer resumes the communication from the stage interrupted last time, the reader/writer of the existing communication system that performs NFC communication transmits a processing instruction including IDm (first identification information). That is, the information processing device in accordance with this embodiment can, without depending on whether or not the communication between the reader/writer of the existing communication system that performs NFC communication and the information processing device in accordance with this embodiment is interrupted, receive a processing instruction including IDm (first identification information) and perform a process in accordance with the information processing method in accordance with this embodiment.

Accordingly, when the information processing device in accordance with this embodiment has a configuration in accordance with another method of making the information processing device support a plurality of communication methods or communication standards as shown in FIG. 1B, for example, it becomes possible to further increase the possibility that the information processing device in accordance with this embodiment can perform a process corresponding to a processing instruction more normally than can the information processing device to which the technology described in JP 2011-118837A is applied.

Thus, the information processing device in accordance with this embodiment can cause an application, which is capable of processing a processing instruction of a different communication method from a communication method supported by an operating system, to perform a process corresponding to a processing instruction received from an external device.

Although the information processing device 100 is described above as this embodiment, this embodiment is not limited thereto. This embodiment can be applied to various devices like, for example, a communication device (or a portable communication device) such as a portable phone or a smartphone, an IC card, a video/music reproducing device (or a video/music recording/reproducing device), a game machine, or a computer such as a PC (Personal Computer).

(Program in Accordance with this Embodiment)

When a program for causing a computer to function as the information processing device in accordance with this embodiment (e.g., a program that can execute a process in accordance with the information processing method in accordance with this embodiment, such as the aforementioned process (1) (determination process) to the aforementioned process (3) (execution process), or the aforementioned process (2) (selection process) and the aforementioned process (3) (execution process) is executed, it becomes possible to cause an application, which is capable of processing a processing instruction of a different communication method from a communication method supported by an operating system, to perform a process corresponding to a processing instruction received from an external device.

A program in accordance with this embodiment can also be applied to a program that implements an execution environment for managing an application, such as "Java Card Runtime Environment" shown in FIG. 1B, for example.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the information processing device in accordance with this embodiment can separately include the determination unit 110, the selection unit 112, and the execution unit 114 shown in FIG. 8 (by, for example, implementing each unit using an individual processing circuit).

In addition, although it has been described that a program (a computer program) for causing a computer to function as the information processing device in accordance with this embodiment is provided, this embodiment can further provide a recording medium having the program stored therein.

The aforementioned configurations are merely illustrative of this embodiment. Naturally, such configurations are within the technical scope of the present disclosure.

What is claimed is:

1. An information processing device for performing contactless communication with an external device, the information processing device comprising:
   a communication circuitry configured to receive a polling command that includes a service type information from an external device;
   a determination circuitry configured to identify a manufacture identification corresponding to the service type information based on a second association information that associates the service type with the manufacture identification;
   wherein the communication circuitry is configured to:
      transmit the manufacture identification to the external device; and
      receive a processing instruction including the manufacture identification from the external device;
   a selection circuitry configured to select an application from a plurality of applications to service the processing instruction based on a first association information that associates the manufacture identification with the application, the application implementing a function of another operating system that supports a communication standard other than a communication standard supported by an operating system of the information processing device; and
   an execution circuitry configured to cause the selected application to perform a process in accordance with the processing instruction, wherein when communication between the information processing device and the external device is interrupted, resuming the selected application from a stage of interruption without re-transmitting a polling command by the external device, wherein the information processing device is at least one of a portable communication device and an integrated circuit card.

2. The information processing device according to claim 1, wherein
   when the selection circuitry has selected the application corresponding to the processing instruction, the selection circuitry is configured to maintain a state in which the selected application is selected,
   the execution circuitry is configured to transmit, when the selected application is not an application corresponding to the processing instruction, a selection request to the selection circuitry to re-select an application corresponding to the processing instruction, and
   the selection circuitry is configured to re-select, when the selection request is transmitted, an application corresponding to the processing instruction on the basis of the manufacture identification included in the processing instruction and the first association information.

3. The information processing device according to claim 2, wherein
   the selection request includes an identification information indicating the selected application, and
   the selection circuitry is configured to select, as an application to be selected, an application indicated by the identification information that satisfies a predetermined condition in relation to the identification information included in the selection request, among a plurality of applications included in the first association information.

4. The information processing device according to claim 1, wherein
   when the selected application is not an application corresponding to the processing instruction, the execution circuitry is configured to:
      determine when an application related to the selected application is able to perform a process in accordance with the processing instruction, and
      cause the application determined to be able to perform a process in accordance with the processing instruction to perform the process in accordance with the processing instruction.

5. The information processing device according to claim 1, wherein the first association information has a data structure in which each manufacture identification corresponds to a respective application.

6. The information processing device according to claim 1, wherein the second association information has a data structure in which each service type information corresponds to a respective manufacture identification.

7. The information processing device according to claim 1, wherein each of the plurality of applications respectively corresponds to only one of a plurality of manufacture identifications.

8. The information processing device according to claim 1, further configured to support a plurality of operating systems.

9. The information processing device according to claim 8,
wherein each one of the plurality of operating systems corresponds to one or more applications, and
wherein the information processing device is configured to switch between the plurality of operating systems based on the selection of the application.

10. The information processing device according to claim 1, wherein the selected application includes a plurality of file systems, each file system is associated with a unique identification information, and
wherein the information processing device is configured to switch between the plurality of file systems within the selected application based on the unique identification information.

11. An information processing method of an information processing device performing contactless communication with an external device, the method comprising:
receiving a polling command that includes a service type information from an external device;
identifying a manufacture identification corresponding to the service type information based on a second association information that associates the service type with the manufacture identification;
transmitting the manufacture identification to the external device;
receiving a processing instruction including the manufacture identification from the external device;
selecting an application from a plurality of applications to service the processing instruction based on a first association information that associates the manufacture identification with the application, the application implementing a function of another operating system that supports a communication standard other than a communication standard supported by an operating system of the information processing device; and
causing the selected application to perform a process in accordance with the processing instruction, wherein when communication between the information processing device and the external device is interrupted, resuming the selected application from a stage of interruption without re-transmitting a polling command by the external device, wherein the information processing device is at least one of a portable communication device and an integrated circuit card.

12. A non-transitory computer readable medium having a computer program recorded thereon, the computer program configured to perform a method of an information processing device performing contactless communication with an external device when executed on a computer, the method comprising:
receiving a polling command that includes a service type information from an external device;
identifying a manufacture identification corresponding to the service type information based on a second association information that associates the service type with the manufacture identification;
transmitting the manufacture identification to the external device;
receiving a processing instruction including the manufacture identification from the external device;
selecting an application from a plurality of applications to service the processing instruction based on a first association information that associates the manufacture identification with the application, the application implementing a function of another operating system that supports a communication standard other than a communication standard supported by an operating system of the information processing device; and
causing the selected application to perform a process in accordance with the processing instruction, wherein when communication between the information processing device and the external device is interrupted, resuming the selected application from a stage of interruption without re-transmitting a polling command by the external device, wherein the information processing device is at least one of a portable communication device and an integrated circuit card.

* * * * *